US008919856B2

(12) United States Patent
Sia, Jr. et al.

(10) Patent No.: US 8,919,856 B2
(45) Date of Patent: Dec. 30, 2014

(54) SUNSHADE HOOK

(71) Applicant: Honda Motor Co., Ltd., Tokyo (JP)

(72) Inventors: Generoso Tan Sia, Jr., Plain City, OH (US); Shinichi Yamase, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/833,437

(22) Filed: Mar. 15, 2013

(65) Prior Publication Data

US 2014/0265423 A1 Sep. 18, 2014

(51) Int. Cl.
*B60J 3/02* (2006.01)
*B60J 1/20* (2006.01)

(52) U.S. Cl.
CPC .................................. *B60J 1/2047* (2013.01)
USPC ......................................... 296/97.9; 296/152

(58) Field of Classification Search
CPC ........ B60J 3/023; B60J 3/0265; B60J 3/0221; B60J 3/0217; B60J 3/0213; B60J 3/0208; B60J 3/02; B60J 3/00
USPC ............. 296/97.1, 97.8, 97.9, 1.08, 152, 214; 24/458
See application file for complete search history.

(56) References Cited

U.S. PATENT DOCUMENTS

| | | | |
|---|---|---|---|
| 4,047,353 A | 9/1977 | Aarons | |
| 4,451,076 A * | 5/1984 | Viertel et al. | 296/97.1 |
| 5,411,310 A * | 5/1995 | Viertel et al. | 296/97.9 |
| 5,507,545 A * | 4/1996 | Krysiak | 296/97.9 |
| 6,322,126 B1 * | 11/2001 | Kraus | 296/97.9 |
| 6,324,732 B1 * | 12/2001 | Arisaka et al. | 24/458 |
| 6,336,672 B2 * | 1/2002 | Beaver | 296/97.9 |
| 6,491,333 B2 * | 12/2002 | Ichikawa et al. | 296/97.9 |
| 7,117,927 B2 | 10/2006 | Kent et al. | |
| 7,534,134 B2 | 5/2009 | Qiu | |
| 7,798,552 B2 | 9/2010 | Takai | |
| 8,474,110 B1 * | 7/2013 | Sherriff | 24/458 |
| 8,556,328 B1 * | 10/2013 | Middleton | 296/143 |
| 8,579,010 B2 * | 11/2013 | Medlar et al. | 160/368.1 |
| 2007/0099452 A1 * | 5/2007 | Okada et al. | 439/101 |
| 2010/0219313 A1 | 9/2010 | Ogino et al. | |
| 2011/0240815 A1 | 10/2011 | Chak | |

* cited by examiner

*Primary Examiner* — Gregory Blankenship
(74) *Attorney, Agent, or Firm* — Fay Sharpe LLP

(57) ABSTRACT

A sunshade hook includes a generally j-shaped hook member having a first leg portion and a second leg portion connected thereto along a bight region. A base has a substantially planar first portion that extends substantially perpendicular to the first leg portion of the hook member, and a second portion that extends generally parallel relation to the base first portion. A snap tab selectively deflects as the base is advanced over a bracket for mounting the one-piece hook in an associated automotive vehicle.

19 Claims, 9 Drawing Sheets

SUNSHADE HOOK

BACKGROUND OF THE DISCLOSURE

This disclosure relates to a one-piece hook for supporting a sunshade, and more particularly to a one-piece hook that is easy to assemble or install in an associated automotive vehicle. For purposes of this application, a sunshade is a screen (often flexible and retractable) that when deployed is typically used to shade a window and is often held in a deployed or extended position by inserting a rod-shaped member of the sunshade or a handle portion of the sunshade into a hook(s) that is(are) secured to the automotive vehicle interior, for example along an upper edge of a door assembly adjacent a window opening.

Current designs of a sunshade hook use two separate components, namely, a hook and a separate fastener or cover that is subsequently joined to the hook. A bracket typically extends from the vehicle, and the hook is secured to the bracket. For example, in one commercial arrangement, the hook has a hollow post that is clipped to the bracket. Once that connection is complete, a cover is then secured over the bracket and hook, and a separate retaining member such as a post is placed between the hollow post and the sunshade hook in order to connect together the multiple components. Alternatively, another arrangement uses a fastener such as a screw to secure the hook to the automotive vehicle interior such as a sash, and then a cap is assembled to cover the fastener. In still another arrangement, a grommet is inserted into an opening in the sash, and a pin or protruding portion of the sunshade hook is pushed through to flare the grommet outwardly and hold the sunshade in place.

These arrangements increase assembly time and add a component or part that must be inventoried and installed by the manufacturer. It can also be difficult to control the orientation of the components during the installation/assembly. Likewise, the arrangement can be installed incorrectly (e.g., facing inboard or inwardly rather than facing outboard or outwardly, or vice versa).

Although the present designs have been commercially successful, areas for improvement have been noted. First, more tooling is required for procurement, i.e., one set of tooling for manufacturing each component or part. Because the components are separately formed, there is a possibility that subsequent joining of the individual components will be impacted, for example, by a color mismatch. Thus, even under carefully controlled manufacturing conditions, variability exists from one manufacturing batch to another and from one component to another. Therefore, when separately manufactured components are subsequently assembled, any potential color mismatch is emphasized due to the side-side relationship of the different components in the assembly.

On the assembly line, each component typically has its own tote or bin in which like components are stored. A reduced number of components and less clutter in the assembly area is helpful for assembly personnel, i.e., reducing the number of components likewise reduces the number of separate totes. Further, the components are each individually relatively small, and thus more difficult to handle and assemble. Still further, minimizing the number of different components required in inventory is important, and likewise reducing the number of different components for spare part distribution is also important.

There is also an increased possibility of poor fit and finish where separate components are subsequently assembled together. Likewise, a slightly larger product is an inherent result of using two components and there is less versatility because of the specialized individual aspects of and associated required size for each component.

There is also a need for a less bulky design that will improve the overall appearance or aesthetics.

Providing only one part to assemble at the factory addresses inventory concerns, assembly time, and costs.

Yet another area for improvement is addressing incorrect installation issues.

In addition, replacement of the hook when damaged can be cumbersome in existing designs.

Accordingly, a need exists for an alternative hook design that overcomes one or more of these issues in providing a one-piece, simplified design that has greater versatility and eliminates one or more of the problems enumerated above.

SUMMARY OF THE DISCLOSURE

A sunshade hook for an associated automotive vehicle includes a generally J-shaped hook member having a first leg portion and a second leg portion shorter than the first leg portion. The leg portions are interconnected along a bight region. A base has a substantially planar first portion extending in a first plane substantially perpendicular to the first leg portion of the hook member, and a base second portion disposed in spaced, generally parallel relation to the base first portion. A snap tab selectively deflects relative to the base as the base is advanced in a direction parallel to the first plane and along an axial direction defined perpendicular to the spacing between the first and second leg portions as the hook is secured to the associated automotive vehicle.

A stop member extends from base and is configured to limit insertion of the hook member relative to the associated automotive vehicle.

The snap tab is normally biased in an undeflected position through an opening in the base second portion.

In one arrangement, the base second portion opening extends through a stop member extending from the base, and the stop member is configured to limit insertion of the hook member relative to the associated automotive vehicle.

The hook member, base, snap tab, and stop member are formed from a unitary, one-piece material.

In one arrangement, the hook member is generally centered on the base, the snap tab is likewise generally centered on the base, and the snap tab is cantilever-mounted to the base.

The hook member includes a tapering conformation that increases in thickness as the snap tab proceeds in a direction of the second leg portion extending toward the first leg portion.

The bracket includes an opening dimensioned to receive a portion of the snap tab as the snap tab deflects upon contact with the bracket in one embodiment.

A primary benefit of the present disclosure relates to the reduced number of components, and only one part to assemble.

Another feature of this disclosure relates to improved appearance.

Still another advantage is associated with the fact that the hook can only be installed in one manner.

Still other benefits and advantages of the present disclosure will become apparent to those skilled in the art upon reading and understanding the following, detailed description.

DETAILED DESCRIPTION

Figure 1:
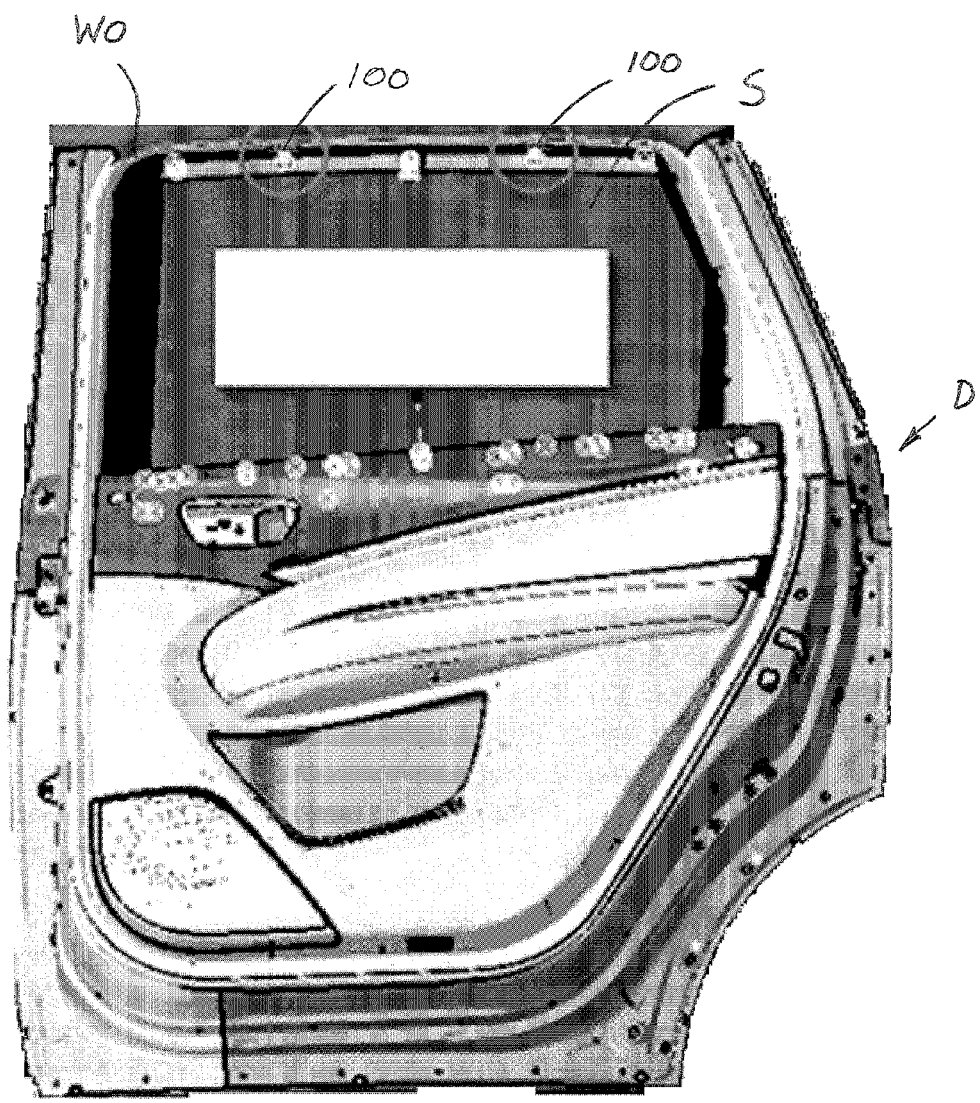
FIG. 1 is a plan view of a door interior generally illustrating preferred locations for sunshade hooks.

Turning first to FIG. 1, there is shown a vehicle door D, such as an exemplary right rear passenger door (although another door such as a left rear passenger door could also be illustrated), that advantageously includes first and second sunshade hooks mounted to the door at a location above a window opening WO. A sunshade S is selectively deployed or extended upwardly from a stored position in the door D along a lower edge or belt line of the window opening WO.

Figure 2:
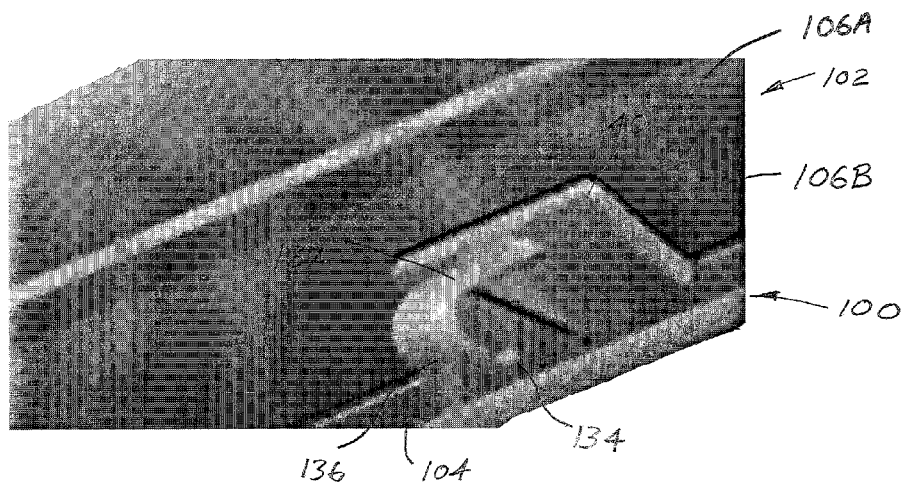
FIG. 2 is a perspective view of a sunshade hook secured to an automotive vehicle interior.
Figure 3:
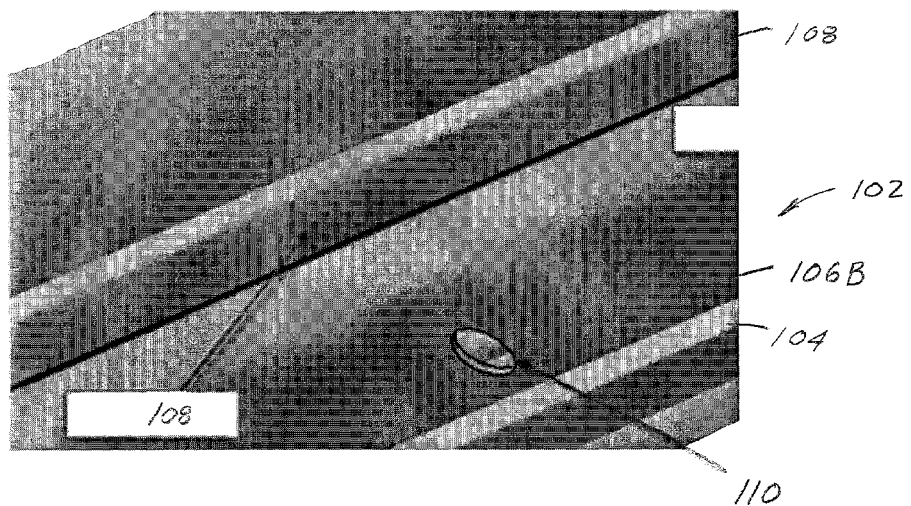
FIG. 3 is a perspective view of the automotive vehicle interior with the hook and bracket removed.

In a first embodiment shown in FIGS. 2-11, a one-piece molded hook 100 is secured to an interior 102 of the associated automotive vehicle door D (FIG. 2). More specifically, the interior 102 includes a glass run channel 104 provided about a perimeter of the window opening WO in the door D, for example. The glass run channel 104 is adjacent a sash garnish 106A and upper sash 106B and a door opening seal 108. As seen in FIG. 3, the upper sash 106B includes an opening 110. As will become more apparent below, the opening 110 in the upper sash 106B becomes a desired location to secure the hook 100 to the automotive vehicle interior. Of course this does not preclude mounting of the hook at other locations along the interior of the automotive vehicle.

Figure 4:
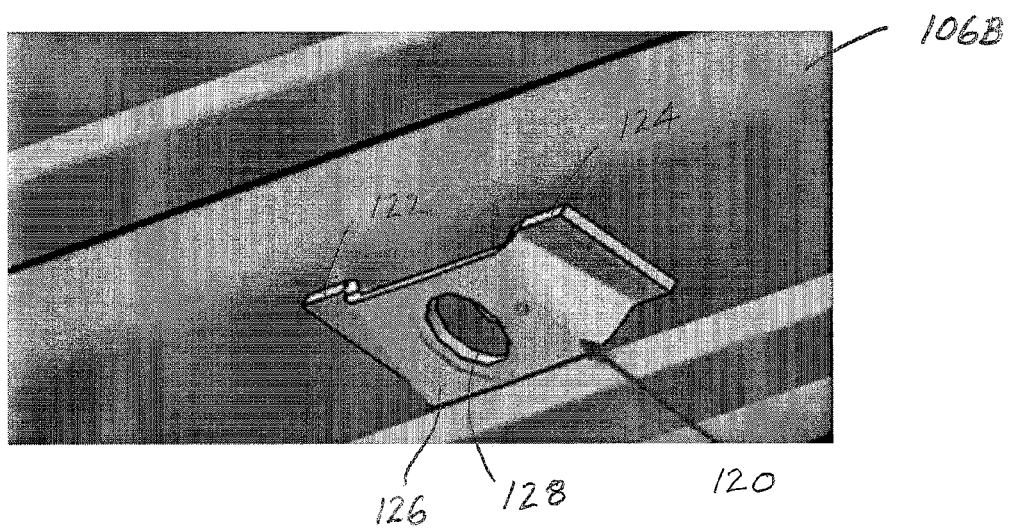
FIG. 4 is perspective view of a bracket prior to installation in the automotive vehicle interior.
Figure 5:
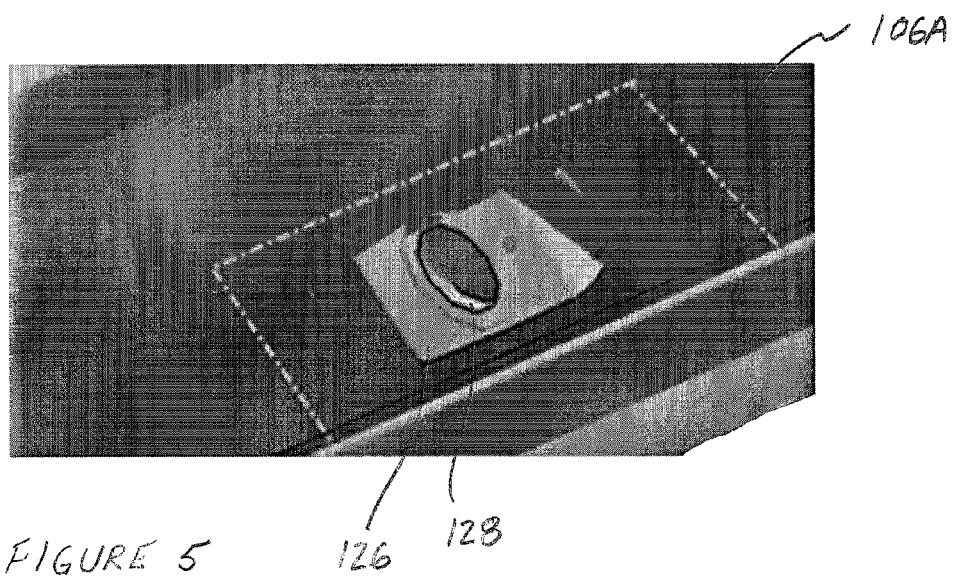
FIG. 5 is a view similar to FIG. 4 with the bracket installed on the sash and the sash garnish covering the bracket.

It is common to employ a rigid bracket such as bracket 120 shown in FIG. 4 in securing the hook to the associated automotive vehicle interior. The bracket 120 includes an opening 128 for reasons that will become more apparent below. First and second ends 122, 124 of the bracket are generally defined in a first plane while central portion 126 is offset from and extends at an angle relative to the opposite ends. The bracket ends 122, 124 are secured to the upper sash 106B. Preferably, the bracket is a metal construction for durability, strength, and rigidity so that the opposite ends of the bracket are fused or welded to the upper sash 106B, however, other materials of construction may be employed without departing from the scope and intent of the present disclosure. To effectively mount the bracket, the sash garnish 106A is trimmed in order to accommodate the bracket as shown in FIG. 5. The opening 128 in the bracket 120 is aligned with and spaced from the opening 110 in the upper sash 106B. Specifically, the central portion 126 of the bracket is spaced from the surface of the upper sash 106B around the aligned openings 110, 128 in the sash and bracket, respectively, by a predetermined dimension that substantially corresponds to the thickness of the base second portion as will be described in greater detail below.

Figure 6:
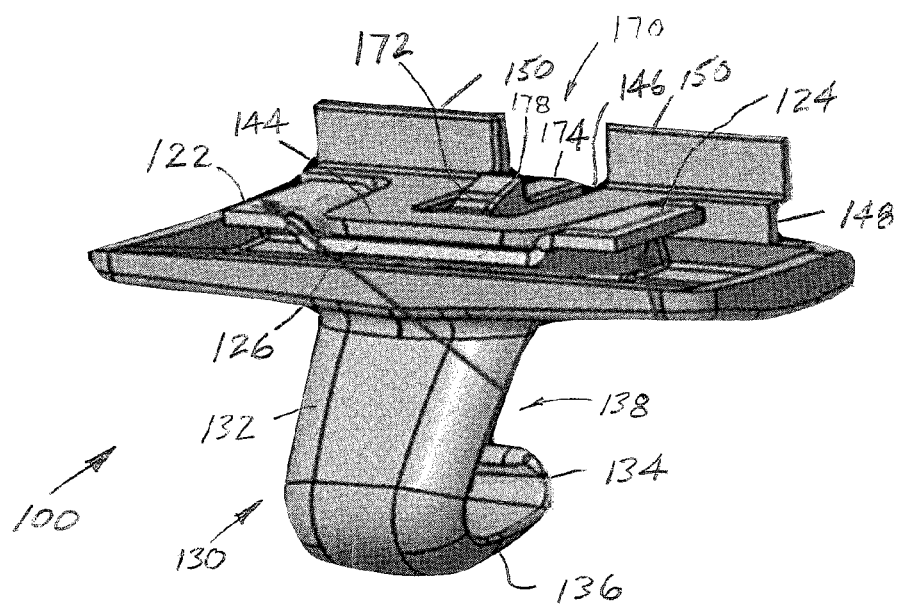
FIG. 6 is a perspective view of the hook assembled to the bracket.
Figure 7:
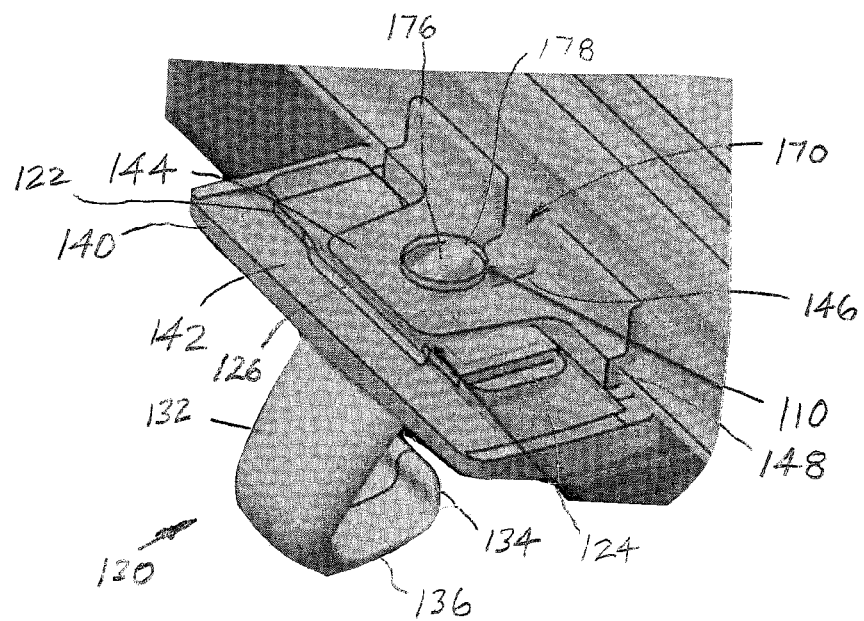
FIG. 7 is a perspective view of the hook and bracket, mounted to the automotive vehicle interior.
Figure 8:
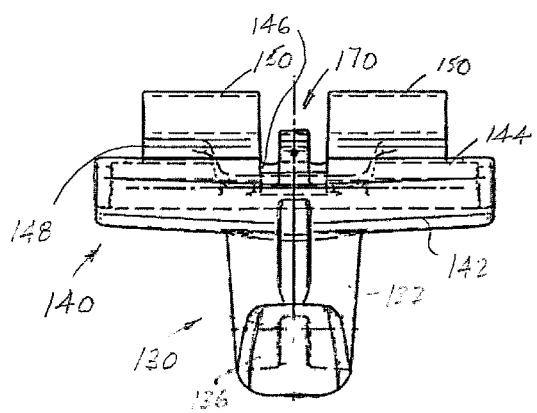
FIG. 8 is a front elevational view of the hook.
Figure 9:
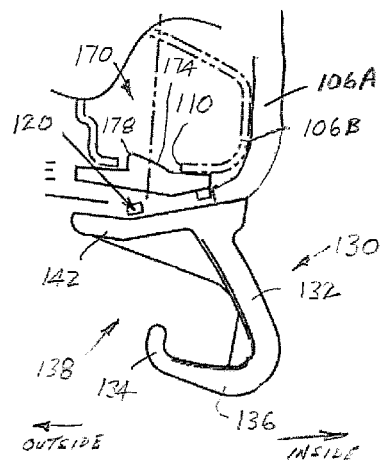
FIG. 9 is a cross-sectional view of the hook taken through a median plane of FIG. 8.
Figure 10:
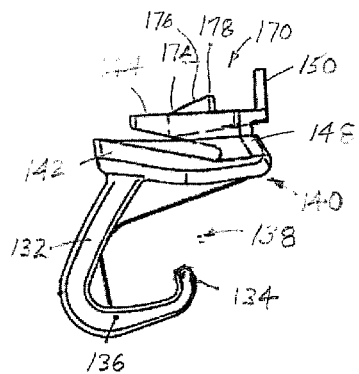
FIG. 10 is a side view of the hook taken from the left-hand side of FIG. 8.
Figure 11:
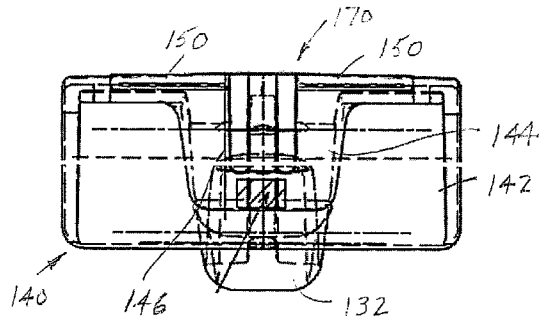
FIG. 11 is a plan view of the hook taken from the top of FIG. 8.

The hook 100 is secured to the interior 102 of the automotive vehicle along the upper sash 106B, and is also secured to the bracket 120. Those features of securing the hook to the bracket are best illustrated in FIGS. 6 and 7 because the surrounding features of the automotive vehicle interior are either removed (FIG. 6) or partially removed (FIG. 7), and particular structural details of the hook are illustrated in FIGS. 8-11. More specifically, the one-piece hook 100 includes a generally J-shaped hook member 130 having a first leg portion 132 and a second leg portion 134. The leg portions 132, 134 are connected to one another along a bight region 136. The first leg portion is longer than the second leg portion and forms an entrance opening 138 dimensioned to receive a rod (not shown) of an associated sunshade (not shown). The first leg portion 132 extends from a base 140 that includes a substantially planar first portion 142 and a substantially planar second portion 144. The base second portion 144 is disposed in spaced, generally parallel relation to the base first portion 142. Moreover, the base second portion 144 is dimensioned to conform to a top surface of the central portion 126 of the bracket. Thus as best illustrated in FIGS. 6 and 7, the first and second portions 142, 144 of the base 140 are generally received on opposite faces of the bracket 120 when the hook is mounted thereto. That is, the spacing between the parallel base portions 142, 144 closely conforms to a thickness of the bracket 120 so that the base first portion 142 is disposed on the inboard or show surface side of the bracket while the second base portion 144 is disposed on the top surface of the bracket. Further, the second base portion 144 has a recess or generally u-shaped cutout 146 in a central region thereof for reasons that will be described in greater detail below.

Since the first and second portions 142, 144 of the base 140 are interconnected along a common edge wall 148, the first and second bracket portions have some inherent resiliency or elasticity so as to tightly grip the opposite faces of the bracket 120. In addition, the edge wall 148 in conjunction with the wall extensions 150 that extend generally perpendicular from an upper face of the base second portion 144 serve as a stop member to limit insertion of the hook over the bracket, and also assure that the hook is properly installed onto the bracket. Stated another way, the hook 100 can only be installed onto the bracket in one direction since the edge wall 148 and wall extensions 150 preclude sliding receipt of the base 140 over the bracket 120 along the interconnecting edge wall of the first and second portions of the base, while the spaced arrangement or gap defined between the first and second portions of the base at the opposite edge of the base is oriented relative to the thickness of the bracket for sliding receipt over the bracket. The enlarged, lower first portion 142 of the base is slidingly received on the underside of the bracket, and the smaller, upper second portion 144 of the base is slidingly received on the upper side of the bracket 120. The edge wall 148 and wall extensions 150 abuttingly engage the edge of the bracket and the edge of the upper sash 106B, respectively. Thus the edge wall 148 and wall extensions 150 serve as a stop member to orient and allow the installer to mount the hook 100 from the outboard face of the vehicle toward the interior of the automotive vehicle. Other orientations or attempts to install the hook 100 over the bracket 120 would be precluded.

Once the hook 100 is slid over the bracket 120, the hook is retained in place by a locking mechanism or snap tab 170. More particularly, the snap tab 170 extends from the edge wall 148 and is generally oriented in the same plane as the base second portion 144. That is, the recess 146 of the base second portion 144 is dimensioned to allow the snap tab to be separated from the remainder of the base second portion in the area of the recess. The snap tab 170 has an axial dimension that extends from a first or mounting end 172 where the snap tab joins the inboard edge of base 144 in a cantilever mounting, and proceeds into the recess 146 in the base second portion 144 to a distal end or nose 174. The snap tab 170 has a tapering conformation over at least a portion of its length formed by an angled wall 176 that increases in thickness as the snap tab proceeds from the nose 174 to a locking shoulder 178. The angled wall 176 slidingly engages the upper sash 106B as the hook 100 is advanced over the upper sash 106B and thus the snap tab is deflected away from the base second portion 144 and toward the second leg 134. Once the locking shoulder 178 reaches the opening 110, the resilient nature of the snap tab 170 urges the locking shoulder into the opening 110 of the upper sash 106B which precludes inadvertent removal of the hook from the automotive vehicle interior 102. The opening 128 in the central portion 126 of the bracket 120 is for locating the bracket relative to the upper sash 106B. The sash garnish has a U-shaped trim and is assembled to the door panel (not shown) in a manner that encompasses the bracket 120. Advantageously, the sash garnish 106A may be installed before or after the hook is mounted to the vehicle door.

In addition, another advantage that flows from the present sunshade hook design is that if the hook 100 is damaged, replacement of the hook is easy. The snap tab end 172 can be easily accessed when the window is lowered and the hook can be slid outwardly from between the upper sash 106B and the bracket 120. Subsequently, a new hook can be installed in the same manner as described above.

Figure 12:
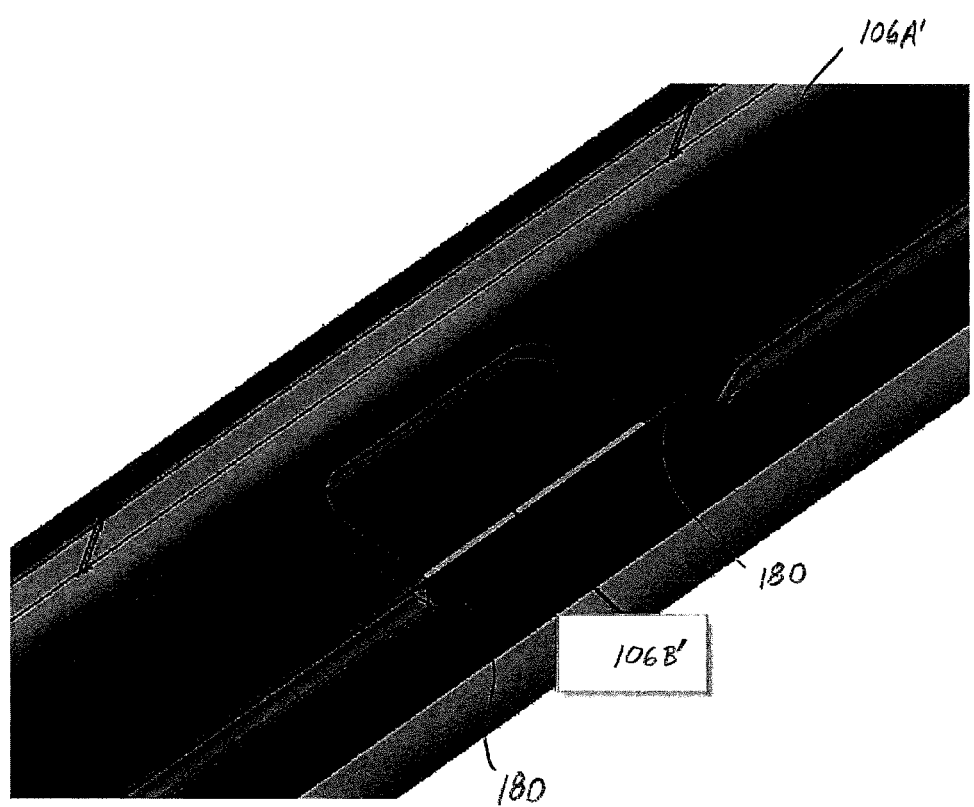
FIG. 12 is a perspective view of the automotive vehicle interior with the hook and bracket removed in a second embodiment of the sunshade hook.

A second embodiment is shown in FIGS. 12-16. Structurally and functionally, this second embodiment has many similarities with the first embodiment of FIGS. 2-11 described above. Therefore, for purposes of brevity and consistency, like components are identified with like reference numerals with a primed suffix (e.g., hook 100 of FIGS. 2-11 and hook 100' of FIGS. 12-16) and new components are identified by a new numeral. Moreover, unless noted otherwise, old and new components are structurally and functionally similar. More specifically, upper sash 106B' is substantially covered along the interior surface by a sash garnish 106A'. A cutout 180 is provided in the sash garnish 106A' (FIG. 12). The cutout 180 is dimensioned to receive bracket 120' that includes first and second ends 122', 124' disposed on opposite sides of central portion 126' that includes opening 128'. The bracket 120' is preferably secured to the upper sash 106B' through a fusion or welding interconnection, although other manners of connecting these components together may be used without departing from the scope and intent the present disclosure.

Figure 13:
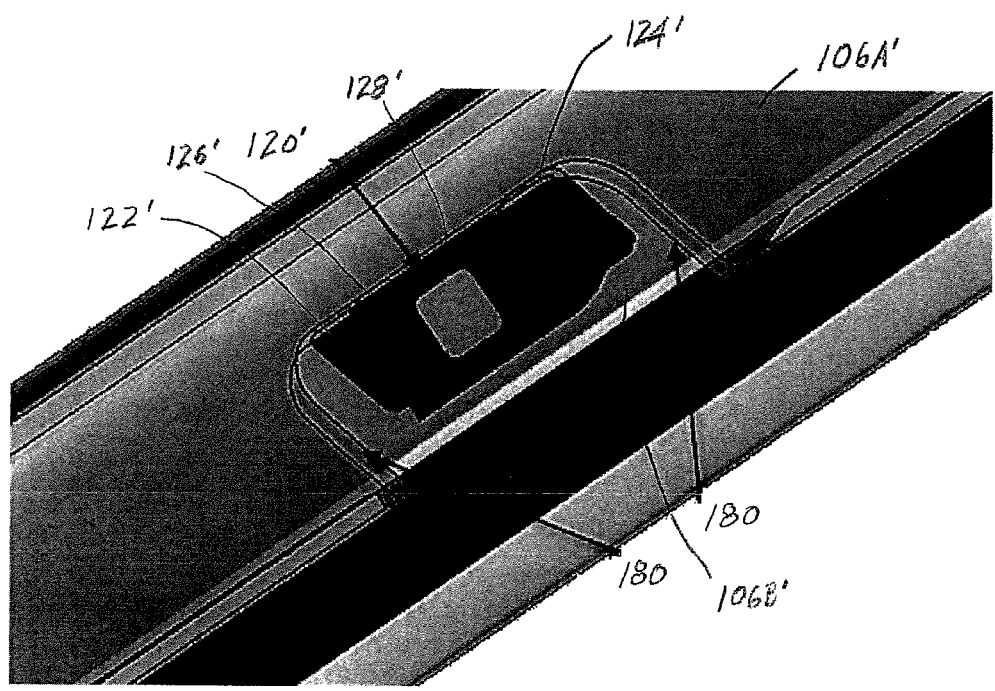
FIG. 13 is a perspective view similar to FIG. 12 with the bracket shown in an installed position within a cutout provided in the sash garnish.
Figure 14:
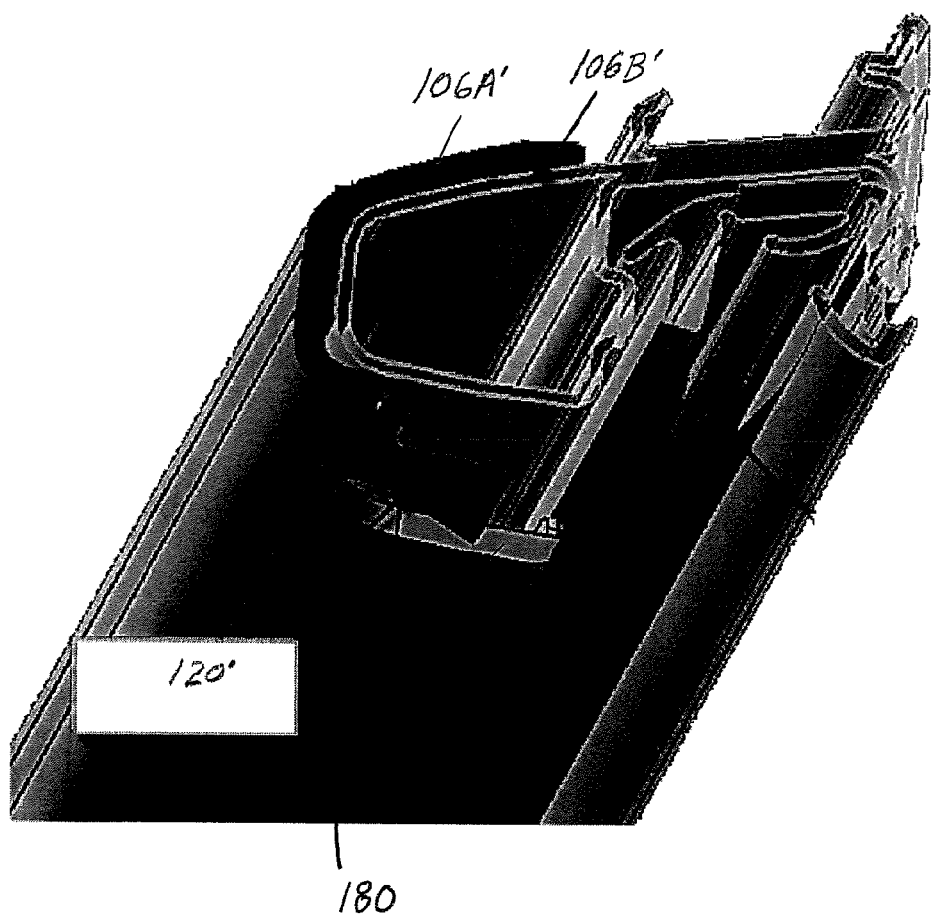
FIG. 14 is a perspective view in partial cross-section of the second embodiment (with the hook removed for ease of illustration).
Figure 15:
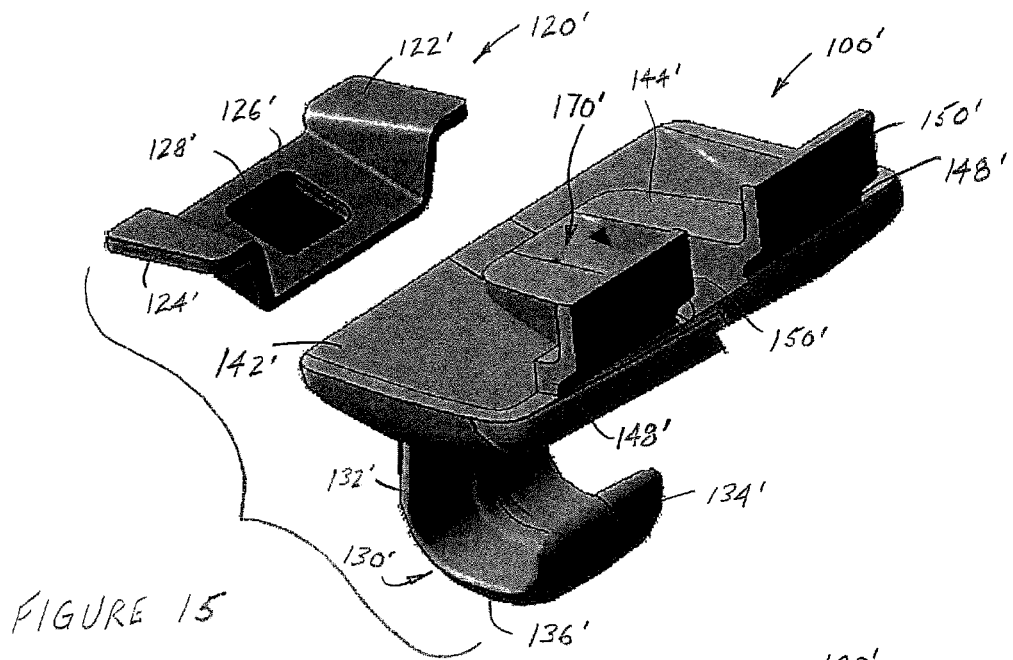
FIG. 15 is a perspective view of the modified hook of the second embodiment prior to attachment to the bracket.
Figure 16:
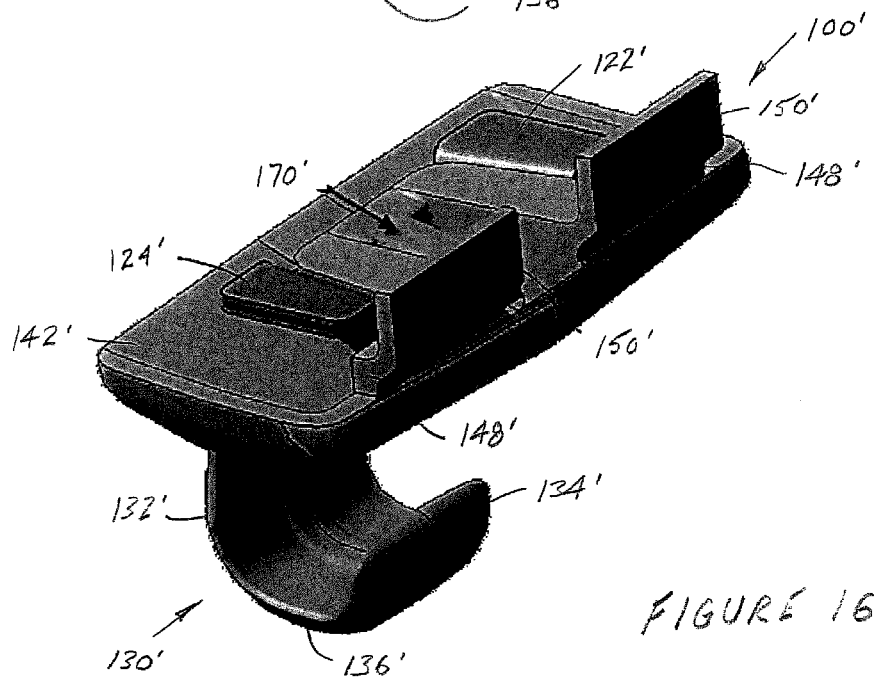
FIG. 16 is a perspective view of the second embodiment with the hook secured to the bracket.

A primary distinction of the second embodiment relative to the first embodiment is noticeably evident in FIGS. 12-14. That is, there is no opening provided in the upper sash 106B'. Therefore, rather than the locking mechanism or snap tab 170' of the single piece hook 100' engaging an opening in the upper sash 106B', the snap tab 170' is inverted when compared to the orientation of the snap tab 170 of the first embodiment (i.e., locking shoulder 178' extends outwardly from the upper second portion 14' in a direction toward the enlarged, lower first portion 142' of the base 140' in this second embodiment). In this manner, the locking shoulder 178' of the snap tab 170' selectively engages opening 128' in the bracket 120'. The snap tab 170' has a tapering conformation over at least a portion of its length formed by angled wall 176' that increases in thickness as the snap tab proceeds from nose 174' to locking shoulder 178'. The angled wall 176' passes along the bracket central portion 126' until such time as the locking shoulder 178' reaches the opening 128 in the bracket. The resilient nature of the material from which the snap tab 170' is formed urges the locking shoulder into the bracket opening 128' and prevents inadvertent removal of the hook from the automotive vehicle interior.

The dimension of the cutout 180 is such that the bracket can be secured before or after the sash garnish 106A' is secured to the upper sash 106B'. Is also noted that the opening 128' in the bracket has a substantially rectangular configuration. Again, one skilled in the art will appreciate that various configurations may be used for the opening.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A sunshade hook adapted for receipt in an associated automotive vehicle, the hook comprising:
   a generally j-shaped hook member having a first leg portion and a second leg portion shorter than the first leg portion and connected thereto along a bight region; and
   a base having a substantially planar first portion extending in a first plane substantially perpendicular relation to the first leg portion of the hook member and a second portion disposed in spaced, generally parallel relation to the base first portion; and
   a snap tab that selectively deflects relative to the base as the hook is secured to the associated automotive vehicle, wherein the snap tab is normally biased in an undeflected position through a recess in the base second portion.

2. The sunshade hook of claim 1 further comprising a stop member extending from the base and configured to limit insertion of the hook member relative to the associated automotive vehicle.

3. The sunshade hook of claim 1 wherein the stop member is configured to limit insertion of the hook member relative to the associated automotive vehicle.

4. The sunshade hook of claim 3 wherein the hook member, base, snap tab, and stop member are formed from a unitary, one-piece material.

5. The sunshade hook of claim 1 wherein the first leg portion extends outwardly from the base first portion and the second leg portion extends from the bight region toward the base first portion and has a distal end that terminates in spaced relation from the base first portion.

6. The sunshade hook of claim 1 wherein the hook member is generally centered on the base.

7. The sunshade hook of claim 6 wherein the snap tab is generally centered on the base.

8. The sunshade hook of claim 1 wherein the snap tab is cantilever-mounted to the second base.

9. The sunshade hook of claim 8 wherein the snap tab includes a tapering conformation that increases in thickness as the snap tab proceeds in a direction of the second leg portion extending toward the first leg portion.

10. A sunshade hook assembly dimensioned for mounting receipt along a sash of an associated automotive vehicle interior, the sunshade hook assembly comprising:
a hook including:
a base having a substantially planar portion extending in a first plane;
a generally j-shaped hook member having a first leg portion extending outwardly from the base and a second leg portion spaced from, shorter than, and connected to the first leg portion along a bight region;
a snap tab extending from the base; and
a bracket secured to the associated sash and dimensioned to selectively receive the base between the bracket and the associated sash, a portion of the snap tab mounted for resilient movement and selectively deflecting relative to the base as the base is advanced in a direction parallel to the first plane and into an opening in at least one of the sash or the bracket to secure the hook member.

11. The sunshade hook assembly of claim 10 wherein the hook is a one-piece, unitary plastic and the bracket is secured to the associated automotive vehicle.

12. The sunshade hook assembly of claim 10 wherein the hook further includes a stop member extending from the base for preventing mounting of the hook relative to the bracket in a first direction.

13. The sunshade hook assembly of claim 12 wherein the stop member further limits sliding receipt of the hook over the bracket in an installation direction.

14. The sunshade hook assembly of claim 10 wherein the base includes substantially planar first and second portions extending in substantially parallel relation to one another.

15. The sunshade hook assembly of claim 10 wherein the snap tab is cantilever-mounted to the base, and the snap tab includes a tapering conformation that increases in thickness from a nose toward a spaced locking shoulder as the snap tab proceeds in a direction of the second leg portion extending toward the first leg portion such that an axial dimension of the snap tab between the nose portion and locking shoulder is received in the sash opening.

16. The sunshade hook assembly of claim 10 wherein the bracket includes an opening dimensioned to receive a portion of the snap tab as the snap tab deflects upon contact with the sash before receipt of the locking shoulder in the sash opening.

17. A sunshade hook assembly comprising:
a bracket mounted to a sash;
a generally j-shaped hook member mounted to the bracket and sash, the hook member having a first leg portion and a second leg portion shorter than the first leg portion and connected thereto along a bight region, an entrance opening to the bight region formed between the first and second leg portions dimensioned to receive an associated rod of an associate sunshade therethrough; and
a base having a substantially planar first portion extending in a first plane substantially perpendicular relation to the first leg portion of the hook member, and a second portion disposed in spaced, generally parallel relation to the base first portion, the first and second base portions being connected by an edge wall, and the base second portion including a recess;
a snap tab received in the recess of the base second portion and mounted to selectively deflect relative thereto as the hook member is advanced in a direction parallel to the first plane as the hook is secured to the associated automotive vehicle.

18. The sunshade hook assembly of claim 17 wherein the snap tab is cantilever-mounted to the base, and the snap tab includes a tapering conformation that increases in thickness from a nose toward a spaced locking shoulder.

19. The sunshade hook assembly of claim 18 wherein the bracket includes an opening, or the sash includes an opening, dimensioned to receive a portion of the snap tab.

* * * * *